July 30, 1935. J. H. JAMES 2,009,663
MANUFACTURE OF OXYGEN DERIVATIVES OF HYDROCARBONS
Filed Aug. 1, 1932 3 Sheets-Sheet 1
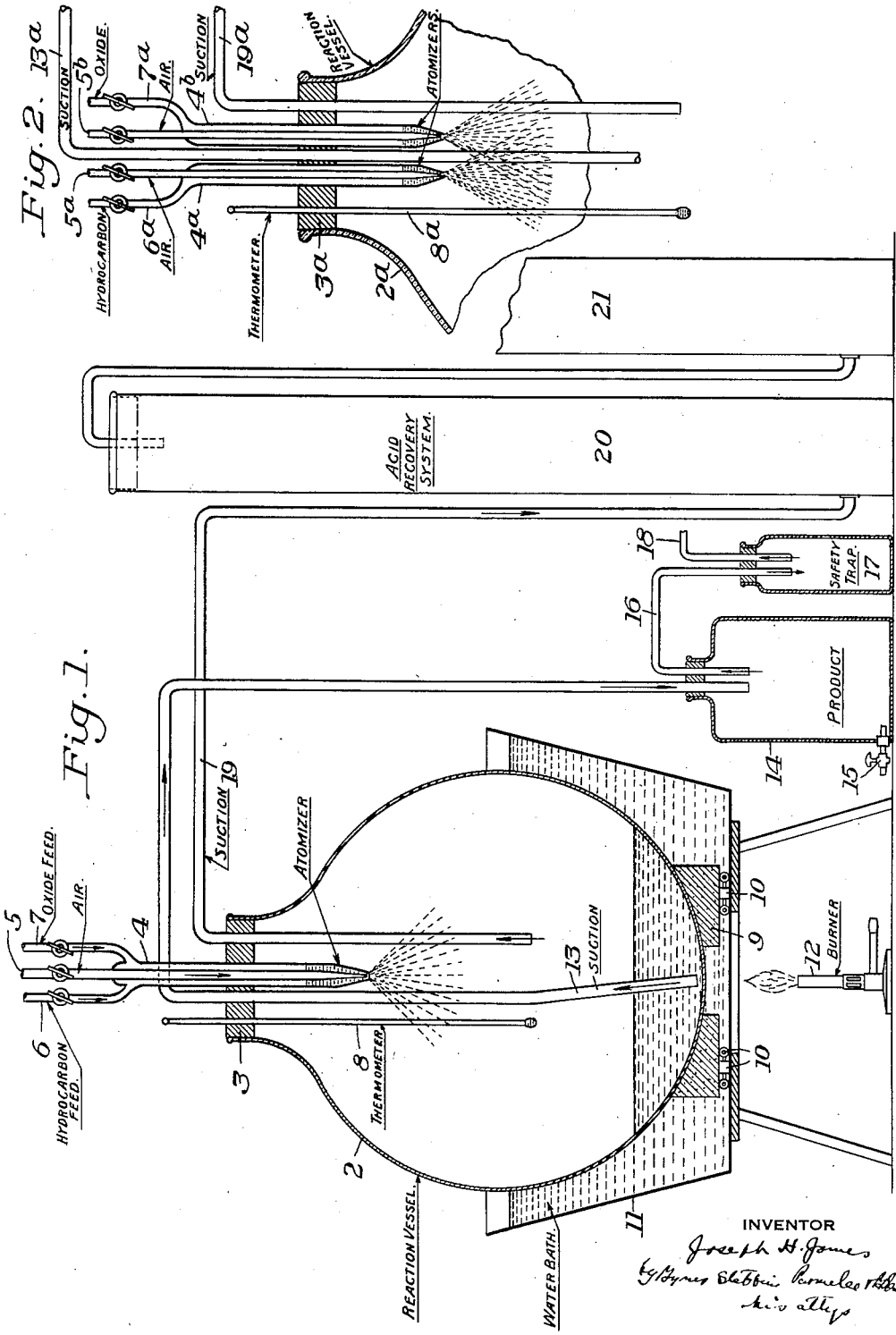

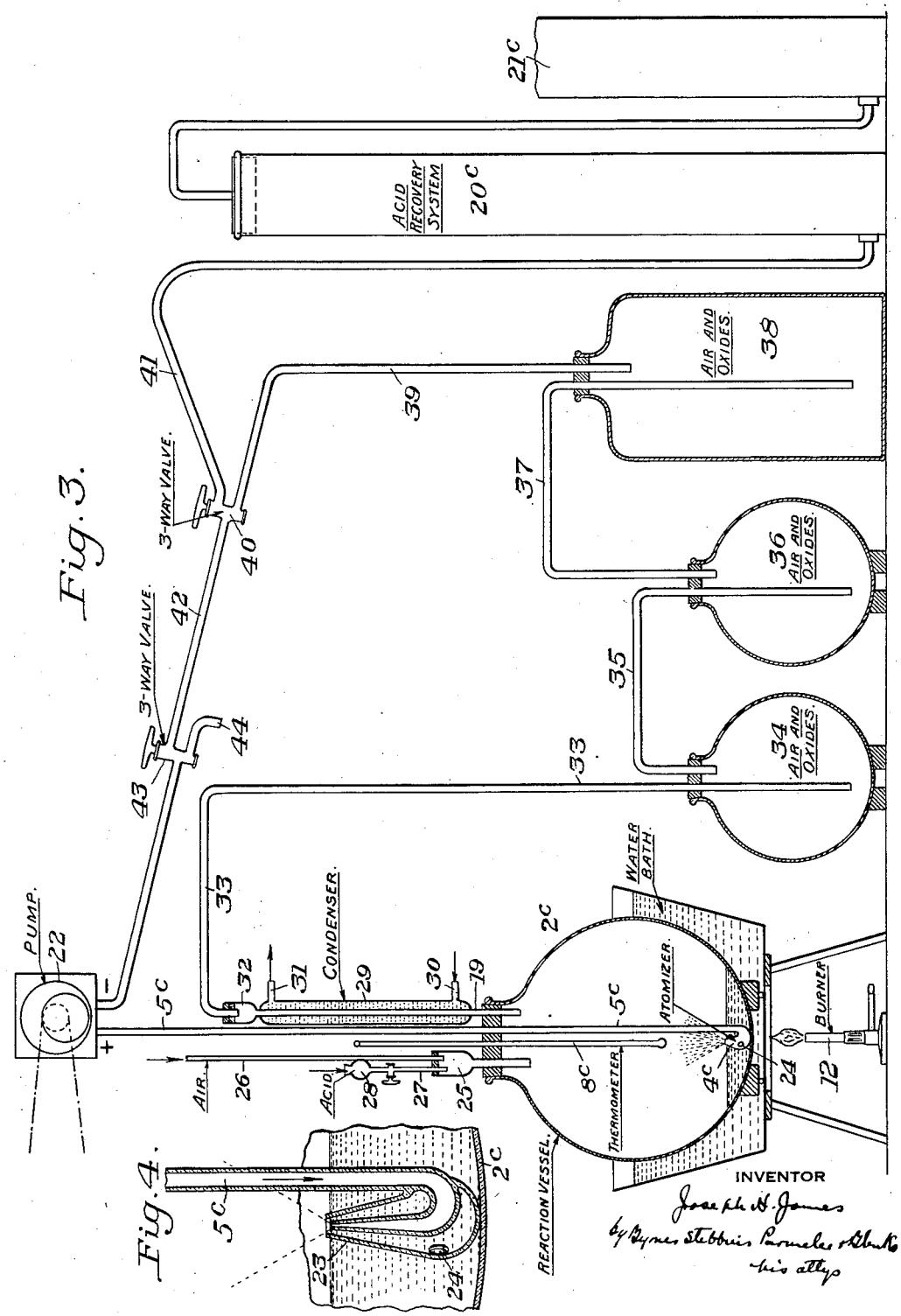

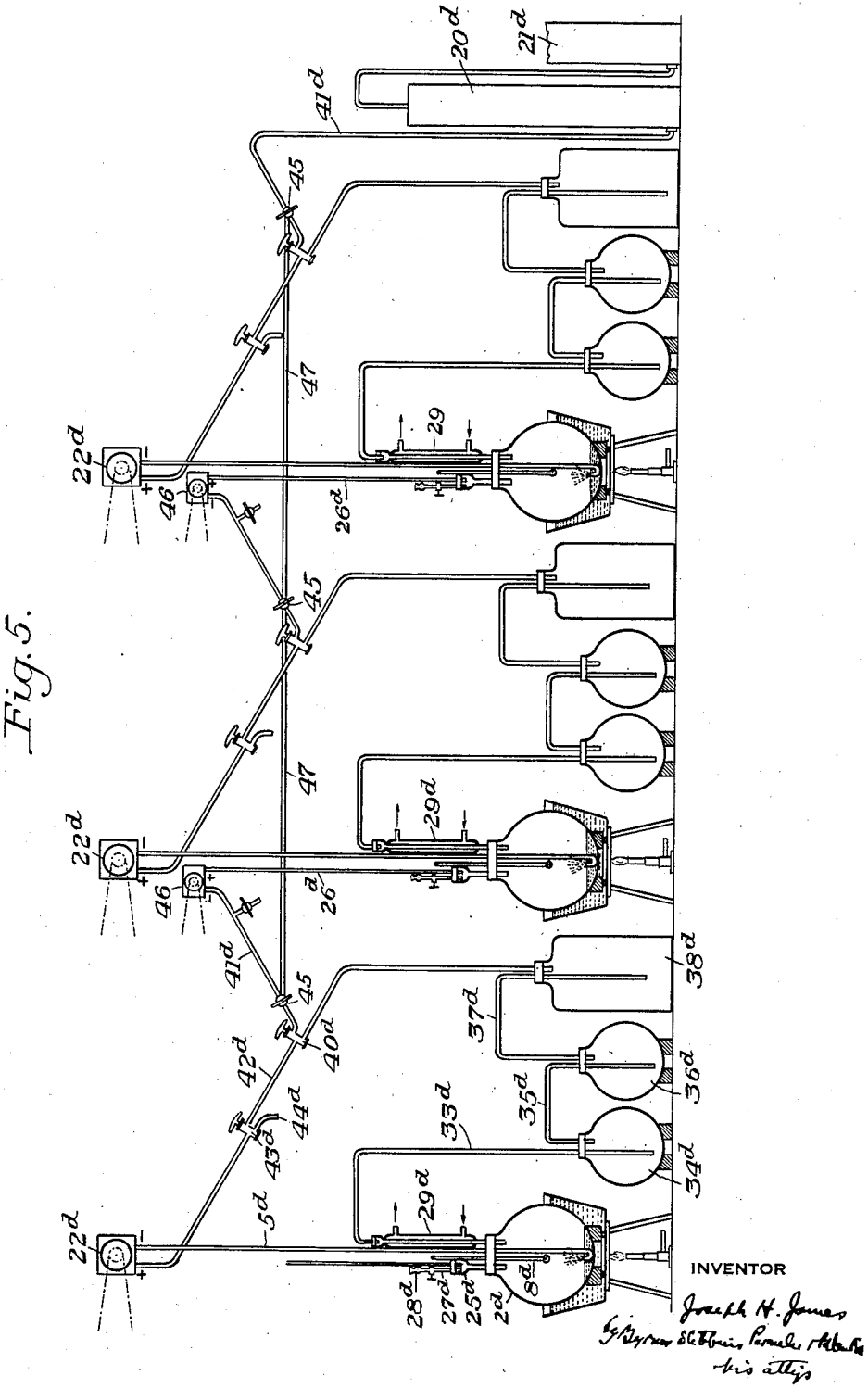

Patented July 30, 1935

2,009,663

UNITED STATES PATENT OFFICE 2,009,663

MANUFACTURE OF OXYGEN DERIVATIVES OF HYDROCARBONS

Joseph Hidy James, Pittsburgh, Pa., assignor to Clarence P. Byrnes, Sewickley, Pa., as trustee Application August 1, 1932, Serial No. 627,178

27 Claims. (Cl. 260—116)

Reference is had to the accompanying drawings, forming part of this specification, in which:

Figure 1 is a diagrammatic side elevation showing one form of apparatus for carrying out my invention;

Figure 2 is a broken detail showing another form of atomizing device;

Figure 3 is a view similar to Figure 1, showing a cyclic form of apparatus for carrying out my invention;

Figure 4 is a detail view of the atomizing device shown in Figures 3 and 5; and

Figure 5 is a view similar to Figure 3, showing a series form or arrangement thereof.

In the partial oxidation of hydrocarbons in the vapor or gas phase wherein the hydrocarbon is mixed with an oxygen-containing gas, such as air, and is passed through a hot reaction zone, preferably in the presence of a catalyst such, for example, as set forth in my Patent No. 1,697,653, dated January 1, 1929, the temperature of reaction in forming oxygen derivatives of the hydrocarbons, while lower than that of continuous self-sustained complete combustion, has been within a range in which the product is deleteriously affected in some respects. This is due mainly to two reactions which occur at such temperatures, namely, dehydrogenation which results in the formation of ill smelling unsaturated compounds; and thermal decomposition of incidental cracking which results in forming many compounds or bodies by the thermal decomposition of the hydrocarbon or the oxidized bodies, or both. These reactions which occur at such temperatures greatly increase the complexity of the resulting condensate, cause an objectionable odor and also affect the color.

My invention is designed to overcome these difficulties and to simplify and cheapen the process. Attempts have been made to oxidize hydrocarbons by means of oxidizing agents, such as oxides of nitrogen, nitric acid, chromic acid, etc., the reaction being carried out in the liquid phase. I have discovered that such reactions may be carried out with great rapidity and efficiency when the reacting substances and free oxygen are brought into contact with each other in a finely divided form such as that of a mist or fog.

I have also discovered that in such cases, or with the hydrocarbon in vapor or gaseous phase, a relatively low temperature may be used compared to that employed in former commercial partial oxidation processes of the gaseous or vapor phase type. By combining the reacting substances, including oxygen or air, in finely divided form, which is preferably a fog or mist, but may be in the form of a vapor or gas phase, and employing this low temperature, deleterious and incidental reactions such as thermal decomposition and dehydrogenation may be avoided and a rapid partial oxidation of the hydrocarbons effected. The process is applicable to any hydrocarbon, whether aliphatic or aromatic or of other type and whether the hydrocarbon is normally a solid, a liquid or a gas.

An important feature of the process lies in the use of oxygen-containing gas such as air in connection with an intermediary oxidizing material in the form of oxides such as the different oxides of nitrogen (including nitrous or nitric acid); or chromic oxides including chromic acid; or manganic oxides including manganic acid, in connection with relatively low temperature, below that where undesirable reactions occur.

In carrying out the process, I believe the rational to be as follows, where oxides of nitrogen are used.

The oxide serving as the intermediary is reduced to lower oxide by the withdrawal of oxygen which is chemically tied into the hydrocarbon and the lower oxide is then again raised to a higher oxide by the oxygen of the oxygen-containing gas, and is again reduced to a lower oxide to further oxidize hydrocarbon, etc.; these operations continuing through the reaction period or periods. I believe this to be the correct theory of the process, since larger proportions of the oxides or oxidizing acids or both cause a more complete or extended tying of oxygen into the hydrocarbon. For this reason, therefore, the oxides are not, in my opinion, true catalysts in the usual sense, since when used in small proportions relative to the hydrocarbon, they produce relatively smaller oxidation results; while in larger proportions, they increase the return of oxidized material. This is also true of the air or other oxygen-carrying gas used in the process. If oxidizing agents other than oxides of nitrogen are used, the regeneration to higher oxides may be carried out as a separate step.

I do not, however, intend to limit myself to any theory, although I believe this to be the correct one.

In a preferred form, liquid hydrocarbons are brought into a finely divided condition, such as a fine mist or fog, as for example, by means of an atomizer or nebulizer, are mixed with finely divided oxides such as oxides of nitrogen, and are also mixed with an oxygen-containing gas such as air. Under these conditions, the desired reactions take place below 250° C. and also below 200° C., as well as below 150° C.; and I prefer to carry out the process on hydrocarbons which are normally liquid at a temperature below 100° C. and at or near ordinary room temperature. This relatively low temperature as compared to temperatures used in true catalytic processes of oxidation presents one of the most important and essential differences in my new process; and is especially notable as regards oxidation of aliphatic hydrocarbons which are considered inert and sluggish toward such reactions.

By the term "oxides" herein, I intend to include oxides of nitrogen, chromium, manganese, sulphur, etc., as well as the corresponding acids, nitric acid, chromic acid and manganic acid or similar equivalent acids. If, for example, nitric acid is used, it may be employed either in liquid form or in vapor form and may include the acid itself or the acid plus nitric oxides or the oxides of nitrogen alone. The oxides of sulphur and the corresponding acid $H_2SO_4$ may be used where sulphur is not an undesirable element in the oxidized product. For instance, in forming oxygen derivatives to be used as insecticides or fungicides.

To increase the yield, I preferably increase the relative volume of oxides (or acid) even to a greater proportion of acid than of hydrocarbon treated. The amount of air or other oxygen-containing gas present may be varied, but is preferably beyond the theoretical amount; that is, the free oxygen is preferably more than that required for the continuous regeneration of the oxides as they shift from higher to lower oxides and vice versa. The percentage of acid by volume may be from a relatively lower figure of say, 2½ to 3%, up to a percentage greater than that of the hydrocarbon by volume.

To increase the yield of oxidized bodies, I may use a series of oxidizers and carry out the reactions in successive steps therein either on the same batch or on a continuous feed. In such case, additional oxygen-containing gas such as air, and additional oxides such as oxides of nitrogen may be supplied between any or all of the successive oxidizers following the first; and fresh hydrocarbon mixture in nebulized or atomized form or in vapor or gas phase may be additionally supplied between successive reaction chambers, in which case, collection or condensation of products may be effected between any and all of such successive reactions and in each case, before addition of the reacting materials or any of them, or after the last reaction.

In all cases, the oxides or acids or both may be in the form of a mist or vapor and the air or oxygen-containing gas will cause the regeneration of the oxides to form higher oxides or acid, which then again enter into the reaction and become lower oxides. In all cases, especially where a relatively large percentage of oxides or acid is used, I prefer to employ a nitric acid recovery system into which the atmosphere of the reaction chambers is exhausted, the oxides therein being regenerated into acids by the action of water spray and air as in ordinary nitric acid manufacture, for example, from ammonia oxidation.

A large percentage of the oxides or acids or both may be collected in the reaction chamber or chambers or in chambers communicating therewith. If the reaction chamber is in the form of a closed vessel or communicates with a closed chamber, the oily layer will collect on the layer of nitric or other acid and water, and the layers may be separated by decantation. This will usually give a recovery of the major part of the acid used, while a large part of the remainder may be recovered and converted into nitric acid, as above set forth, in the nitric acid recovery system connected to the outlet or outlets from the apparatus.

The hydrocarbons may be of low molecular weight and may be partly or entirely vaporized in the mixture or in the reaction chamber.

In the case of heavy hydrocarbons, I prefer to employ a mist or fog of the heavy hydrocarbons in connection with a mist of nitric acid or vapor or mist and vapor with oxides of nitrogen and air or oxygen-containing gas.

With lower molecular weight hydrocarbons, I prefer to employ a mist or vapor thereof or a mist and vapor thereof, in connection with a mist of nitric acid or nitric acid vapor or nitric acid mist and vapor with oxides of nitrogen and air or oxygen-containing gas.

It is of advantage, particularly as to color, odor and purity of product, to carry out my process at the lowest possible temperatures compatible with a proper percentage of oxidized product. The products may and usually do extend from alcohols through aldehydes, esters, ethers, etc. to organic acids (partly lactonic). It is possible to carry out the reactions in accord with my process at temperatures below 100° C.

The reaction chamber is preferably kept at a temperature above the dew point, since if below that point, it would cause collection of liquid film on its interior. The amount of air is preferably such that free oxygen is present in the exit gas. The volume of oxygen may be above or below the theoretical amount for formation of the compounds desired through the intermediary of the oxides, but is preferably above that volume.

The reaction vessel is preferably maintained as nearly as possible at a constant temperature by cooling or heating means or by both. For example, the reaction chamber may have a surrounding counterflow system whereby the entering mixture passes over the chamber before entering; or it may be surrounded by cooling jackets in which either liquid or gaseous fluids are used. The heat of reaction will depend upon the particular raw material used, the oxides used, the amount of air, etc.; and I find that in this process, the heavier the hydrocarbon, the easier it is to oxidize the same, and the lower the temperature needed. For heavier hydrocarbons, which are normally liquid, the reaction chamber or chambers may be kept at a temperature below 100° C. and near room temperature by any well known chemical engineering means, such as a water bath, a mercury boiler system, etc. In treating the lighter hydrocarbons, cooling may be used instead of heating, especially after the reaction has begun. These oxidizing reactions give out heat and, depending on the above factors, together with heat losses by radiation, etc., heating or cooling means or both may be needed to maintain the temperature at a substantially uniform point during the carrying on of the process.

In the drawings:

Figure 1 shows a "once through" system where the reaction takes place between the atomized hydrocarbon mixture and the atomized nitric acid and air, the air being introduced under sufficient pressure to effect the atomization of the two mixed liquids. In this form, the closed "Pyrex" glass container 2 has a stopper or closure 3, through which extends an atomizer or nebulizer 4. Compressed air is fed through pipe 5 to the air channel of the nebulizer having a reduced tip. The numeral 6 designates the pipe feeding liquid hydrocarbon, and 7 the pipe which feeds nitric acid. All of these pipes are preferably valved, as shown, to give regulation of the volume feeds of each; and the pipes 6 and 7 are preferably connected to reservoir feeds. The entering air nebulizes the mixed acid and hydrocarbon, and an intimate mixture of finely divided hydrocarbon, air, acid and oxides of nitrogen takes place, in which condition the hydrocarbon is oxidized at relatively low temperatures.

The "Pyrex" vessel, through the closure of which extends a thermometer 8, is shown as set on a cork ring 9, fitted thereto, having a central hole, this cork ring resting on ordinary clay triangles 10, which, in turn, rest on the bottom of a metallic receptacle 11 containing the water bath. 12 is a burner by which the water is preferably brought to a temperature of about 50° C. before the liquids and air are admitted. After this temperature is reached, the burner is usually turned down and regulated so that, including the heat of reaction, the vessel will be maintained at approximately constant temperature. There is a cooling effect through radiation; and if the burner is supplying heat, there is some heat supply to the water, as near a balance as possible being obtained to maintain the uniform temperature condition within the receptacle 2. The vessel is preferably maintained at a temperature above the dew point so that deposition of drops of dew thereon is avoided as far as possible.

In the course of the process, the nitric acid and water collect in the bottom, and overlying this is a layer of hydrocarbon containing oxidized bodies. If these layers are allowed to remain in contact with each other for any extended period, this will result in products having objectionable color because of the development of undesirable heat at the inter-face or junction between the two layers. The reaction between the oxides, or acid, or both, and the hydrocarbon is under better control where it is effectuated under atomized condition, the temperature equilibrium being maintained as nearly as possible by balancing the reaction heat against radiation and heat absorbed by some vaporization; the other temperature factors being the incoming liquids and the water bath in the form shown. Hence, it is of advantage to draw off intermittently or continuously the two liquids that run to the bottom of the reaction chamber; and for this purpose, I show a suction tube 13 leading through the vessel stopper and extending down into a glass vessel 14, this vessel having a valved outlet 15 near the bottom. From this vessel a pipe 16 leads into a safety trap vessel 17, from which the pipe 18 leads to a suction device. The reaction liquids thus entering vessel 14 and drawn off therefrom are preferably separated by decantation or otherwise, and if desired, may then be fed in the same general way into a similar reaction chamber or chambers in series to give a second reaction. More air, and if desired, more nitric acid or nitric oxides, may be added in the second or succeeding reaction chambers in such case.

In the "once through" method, when the operation on the batch is complete, the liquid feeds are shut off, the remainder of the liquid drawn out, and the atmosphere is then exhausted through pipe 19 to the nitric acid recovery towers, two of which are diagrammatically shown at 20 and 21. This recovery tower system may be of any usual type of nitric recovery system in which the vapors, nitric oxides, etc. are regenerated in a nitric acid.

In practice, I have found that the majority, usually about 85%, of the nitric acid fed in is recovered in the lower layer forming in the bottom of the reaction vessel.

If the air is not too much deoxidized in this "once through" operation, it will be possible in arranging a set of reaction vessels in series, to use the gases drawn from the first reaction chamber for the gas feed to the second chamber, omitting the nitric recovery towers until the end of the system is reached, when it will be necessary to supply fresh air, as well as water, for the nitric recovery towers.

Figure 2 shows another form of atomizing system wherein there are two atomizers 4a and 4b. Compressed air pipes 5a and 5b have their reduced tips entering the tip of the atomizers or nebulizers, 6a being the oil feed and 7a the acid feed. In this case, 13a is the suction tube extending to the bottom and serving to draw off the liquid collecting in the receptacle, part of which is shown at 2a. The four pipes 5a, 5b, 6a and 7a have valved control feeds, 8a being the thermometer extending into the reaction vessel. The operations here may be the same as in the first figure.

It will be understood that in the form of Figure 1, when series reaction chambers are used, the liquids drawn out can be fed into the next apparatus without any attempt at separation, if the liquids are handled with sufficient rapidity. If they are withdrawn and separated, they may be handled in a second apparatus like that shown in Figure 2, where liquids are fed in separately.

Figure 3 shows a cyclic form of the apparatus wherein the atomizer 4c is upwardly directed and located at the bottom of the reaction vessel, at the end of a vertically extending tube 5c connected to the plus or ejection side of a pump or forcing device, as indicated at 22. The pipe 5c terminates in a small reduced upwardly directed tip, as shown in Figure 4, which is surrounded by a larger glass tube 23, reduced at the jet and having a liquid inlet 24 at its side. The reaction vessel, water bath, burner, etc. are substantially the same as in the first form, the thermometer being shown at 8c. A glass receptacle 25 has a tube leading through the stopper of vessel 2c, and into the stopper of this receptacle 25 extends a valved air pipe 26 and a valved glass tube 27, leading from an acid reservoir 28. By this means, additional acid or oxides may be fed into the system as well as additional air, both these pipes being valved and the feed being thus regulated, if either or both are used. The hydraulic head on the acid enables it to enter along with the air under pressure. The outlet pipe 19c enters the atmosphere of the reaction chamber, passes through a condenser 29, cooled by the water jacket surrounding the pipe, the jacket having inlet and outlet pipes 30 and 31; and the upper part of this pipe 19c is enlarged at 32, and contains a layer of foraminous material such as glass wool on fine wire mesh. From this enlarged portion the tube 33 leads down into the bottom portion of vessel 34, from which tube 35 leads to the bottom of vessel 36, from which pipe 37 leads to the bottom of vessel 38, from which tube 39 leads to a three-way valve 40. One passage of this valve opens to the pipe 41, which leads to the nitric acid recovery system 20c, 21c; while another port leads to a pipe 42 extending through three-way valve 43 to the minus or intake side of the pump or forcing device 22. The three-way valve 43 has a passage through a port 44 to which a gas-sampling tube may be temporarily attached, thus obtaining samples of the atmosphere in this circulating system.

In using the apparatus, a given quantity of oil and nitric acid is charged into the reaction flask. The air enclosed therein supplies oxygen for regenerating the partially spent nitric acid or oxides, and this amount of air is increased by the air in vessels 34, 36 and 38, which vessels may, of course, be extended to any desirable number or size. With the liquid fed in and the parts in place, the pump drives air and then the atmosphere down into the atomizer, where the liquid lies just above the inner tip thereof, the mixed liquids are driven up into the atmosphere of the flask and atomized and nebulized; the atmosphere above being drawn through the condenser 29 to the vessels 34, 36 and 38, thence to the pump or forcing device, and thence again down into the air tube of the atomizer. The filtering action of the strainer just above the condenser catches any entrained liquids and holds them back from reaching the pump inlet. The oil and oxides and acid running to the bottom of the reaction chamber are caught up continuously by the atomizing jet and driven into the atmosphere of the reaction chamber. In this connection, all the air in the connecting system is utilized in regenerating the oxides and supplying air to raise their oxidation and enable them to be re-used in oxidizing the oil. When the amount of oxygen in the system has been lowered sufficiently, the valve 43 may be closed to pipe 42, the valve 40 may be turned into communication with the nitric recovery system, fresh air is admitted for "purging" through inlet 44 of valve 43, and the oxides of nitrogen and the partially deoxygenated air are forced into the nitric acid recovery towers, together with fresh air entering at 44 if this valve is open to the atmosphere. In the recovery system by supplying fresh air and a proper amount of water, the usual nitric recovery process is carried out.

Instead of the intermittent purging method of operation just described, it is preferable in some cases to continuously tap out a certain proportion, for example, one-fortieth, of the total volume of the gases in circulation, and to make up this loss by the continuous admission of air through pipe 26, and by admission of acid through pipe 27, sufficient to keep the reaction temperature under practically constant conditions. This will give a cyclic operation with a continuous feed of oxides and air until the reactions are carried to the desired point. In this case, valve 40 would be opened to pipes 41, 39 and 42.

This cyclic method involves the circulation of the air and nitrogen oxides through a pump or circulating device, the discharge pressure of the gases serving to re-atomize the oil and liquid acid collecting continuously in the bottom of the reacting chamber. As the oxygen of the air in circulation is exhausted by the re-oxidation of the nitrous oxide and lower oxides, it is desirable to renew the air after that in the system has been exhausted. This may be done by carrying on the operation until the oxygen has been reduced to a low figure, and then admitting fresh air and sweeping out all the gases into the nitric recovery system. This is called "purging". Instead of this intermittent admission of fresh air, I may continuously admit a limited quantity of fresh air and nitric acid, discharging continuously a like volume of spent air and nitrogen oxides into the nitrogen regenerator recovery system.

In using such a continuous method, the valve 40 will be turned to a position where it discharges at least a part of the gas vapor mixture into the nitric acid recovery system, shown at 20c, 21c. In such case, by using a reaction chamber 2c having a valved outlet in its bottom portion, I may withdraw any undesirable portion of the liquid collecting in the bottom of receptacle 2c, to keep this liquid at the proper level therein. The liquid drawn off may then be re-treated, if desired, in a second vessel. This drawing off may be continuous or intermittent.

In Figure 5, I show a series system employing cyclic units, such as illustrated in Figures 3 and 4, where like numerals are applied to similar parts with the letter "d" added. In such case, the pipe or tube 41d has a two-way valve 45, by which the circulating atmosphere may be passed either into the minus or suction side of an auxiliary pump 46 or into a common pipe 47, connecting with the corresponding valves 45 of each unit and connected to the pipe 41d leading to the nitric acid recovery system 20d, 21d. In this case, the atmosphere inlet pipes 26d of the second and third oxidizing chambers and each chamber may have a draw-off cock to maintain the liquid at the desirable level and remove the liquids intermittently or continuously, as desired, from the chambers. In this form, showing one method, the oil will cycle in each chamber, but the air and nitric acid and nitric oxides will pass from one reaction chamber to the next before finally being drawn into the nitric acid recovery system.

In another method, the oxidized oil would remain in each chamber, except as drawn off, but the air and nitric acid and nitrogen oxides would be kept a substantial equilibrium by the continuous admission and continuous tap-out method, the tapping-out from the first cyclic system becoming the feed-in for the next cyclic system, and so on, before passing to the recovery system.

Again, using the form of Figures 1 and 2 in a series system, the oil may be fed continuously into the first reaction chamber and atomized with the air and acid, and the product as it collects therein is pumped over to form the feed of a similar No. 2 apparatus and from such No. 2 to a similar No. 3 apparatus, and so on. In this case, the air with the nitric acid and oxides travels countercurrent to the oil travel. The continuous feed-in and continuous tap-out as mentioned above may be used, the tapping-in starting at the end reaction chamber and the final tapping-out passing to the recovery system of No. 1 reaction chamber.

There are, therefore, three different systems, namely, the "once through" method, the "cyclic" method and the "series" method. The series method may be either cyclic or once through as to each oxidizing chamber. In the once through method, the reacting materials are in contact while in the mist, vapor or gas mixture within each chamber. In the cyclic method, this is repeated in each chamber as long as desired by the atomizing return of the reacting agents into the reaction chamber.

In the series method, several reacting chambers may be used of either the once through or the cyclic method type. In using a series of "once-through" oxidation devices, the two liquids, oil and nitric acid, collecting in the first reaction chamber will be drawn out by gravity or suction and atomized into a second chamber where they meet the air and nitrogen oxides from the first chamber, with or without addition. If used without additional air, the number of chambers would be determined largely by how many of them are needed to reduce the oxygen of the air to the desired amount; but if additional air is used, this may be introduced into the air stream for the chambers beyond the second or third; or at any desirable chamber or at any desirable point. The series method may be operated in parallel current, or it may be operated in parallel current as regards the nitric acid and nitric oxides and air and countercurrent as regards the oil.

A further modification would be to pass the air and nitrogen oxides from chamber No. 1 to chamber No. 2, No. 3 and so on, and bring nitric acid and oil in the reverse direction from No. 3 to No. 2 and thence to No. 1. In such case, each reaction vessel would have a bottom valved tap-out to a common line having pumps to feed the liquids in the reverse direction of the gases as in the Figure 5 form.

The cyclic method involves the circulation of the air and nitrogen oxides through a pump, the discharge pressure of these gases and vapors serving to re-atomize the oil and liquid nitric acid collecting in the reaction chamber. As the oxygen of the air in circulation is exhausted as the re-oxidation continues, it is necessary to eventually renew the air, if there is not sufficient in the system to revivify the oxides. This may be done by operating until the oxygen has dropped to a low figure and then admitting fresh air by sweeping out the gases into the nitric acid recovery system and feeding in fresh air, as in purging. Instead of this intermittent operation, I may continuously admit a limited amount of fresh air and nitric acid at the intake side of the pump, discharging continuously a like volume of spent air and nitrogen oxides therefrom into the nitric recovery system or into the next oxidizer of the set.

As examples of the operation, I cite the following:

Example I

Using Pennsylvania oil as the raw material in apparatus of the type shown in Figure 1, the air feed was 6.2 liters per minute. The time of the run was 7 minutes. The oil used was 180 cc. Concentrated nitric acid (66–70%) was 68.4% by volume of the oil fed, and the average temperature was about 72° C. About 100% by volume of the oil product was recovered, part of which had been oxidized; and by saponification, it was found that this contained about 18% saponifiable matter of the original volume of oil fed by volume.

Example II

With conditions the same as above, except that the nitric acid was increased to 80% by volume of the oil fed, the results were the same except that about 25% of saponifiable matter was obtained with a total recovery of about 98% of the oil fed.

Example III

Using the apparatus of Figure 1, with the two atomizers of Figure 2, the oil treated was the petroleum fraction known as "wax distillate". Concentrated nitric acid (66 to 70%) was used. The wax distillate at the reservoir was about 65° C. The nitric acid at the reservoir was at about room temperature or 26° C. The water bath surrounding the reaction globe was maintained at about 85 to 88° C. 1100 cc. of the wax distillate and 1650 cc. of nitric acid were atomized in a reaction globe in 21 minutes. 85% of the nitric acid fed in was recovered and the liquids drawn off from the bottom of the reaction flask. The oil recovered containing the oxidized bodies was about 97% by volume of the wax distillate fed in. This oxidized oil contained about 27% by volume of organic acids. The sodium soaps of these acids served to emulsify about 50% of the non-saponifiable oil recovered.

The recovered acids are a good color and odor and besides such acids, which make excellent emulsifying and detergent soaps, there are formed alcohols and aldehyde or aldehyde-like bodies from the hydrocarbons present.

Example IV

In this run, an apparatus was set up in accordance with Figures 3 and 4 (modified cycling procedure) with seven nitric-oxide reaction chambers, such as shown, 34, 36 and 38, additional to that shown at 2c. The total volume of the oil reaction chamber and the nitric-oxide reoxidation chambers was 146 liters. The pump circulated the air and oxides of nitrogen at the rate of about 8.02 liters per minute. As operated, the apparatus may be regarded as a "kick in" and "kick out" cyclic system of about 1 to 100 ratio; i. e., about 1% of the circulating gases were ejected from the system, and the same amount of 1% continuously added to the cyclic system. The nitric acid (70%) was fed continuously and uniformly during the run, 156 cc. total being thus fed in.

The oil treated was a Pennsylvania wax distillate, 250 cc. thereof being put in the oil reaction vessel at the beginning of the run which lasted five hours. After two hours, the formation of organic acids had proceeded to a point at which a large amount of froth was produced in the oil reaction chamber 2c. This showed a stiffening of the reaction liquid, even at 110° C. which was the temperature maintained in the oil reaction flask. During the run, the regenerated nitric acid or oxides was not returned to the oil reaction vessel; and at the end the nitric acid remaining in the system amounted to 30%, the remainder passing off in the "kick out". The result was a yield of 92% by volume of oxidized oil.

The oxidized oil was of a light red color and showed a free acid titration of 29.13 magnesium potassium hydroxide per gram, and a saponification number of 139.17 magnesium potassium hydroxide per gram of oil. When saponified, the soaps were high enough in concentration to emulsify all of the non-saponifiable portion of the oil.

The organic acids produced, as far as my work has gone, appear to consist of a mixture of acids which are oxygenated to a milder degree than is possible by my vapor phase catalytic method, and of straight fatty acids. Because of the foregoing, the soaps prepared from these acids show frothing and sudsing characteristics that are closer to those prepared from the natural fats than the catalytic acids noted above.

Example V

In this run, the "once through" apparatus was used, the oxidizing reagent being chromic acid.

In this case, no regeneration occurred in the oil reaction vessel and in using such reagent, regeneration must be carried out in a separate reaction by withdrawal.

The oil charged was 150 cc. of Pennsylvania wax distillate. 87 grams of the anhydride of chromic acid ($Cr_2O_3$) was dissolved in 100 cc. of water and this solution of chromic acid was fed in uniformly for the duration of the run, which lasted one hour and twenty minutes. The temperature of the oil reaction chamber was kept at 110°–120° C.

The greater part of the organic acids formed reacted at once with the reduced chromium oxides to form chromium soaps which coated the interior of the reaction vessel. Over 50% of the oil was oxidized to organic acids, which was mainly recovered in the form of chromium soaps.

The hydrocarbon used in my process may be any product from a cracking or thermal decomposition step; and such cracking may be carried out under the usual high pressure and elevated temperature conditions. It may be done in the liquid phase, or vapor phase, or both. The product of my process may also be cracked or thermally decomposed as a succeeding step, especially where motor fuel is desired. My oxidized product may be neutralized as to acid contact, as by saponifying, and then blended with other hydrocarbons or oxygen derivatives thereof, such as gasoline, benzol, alcohol, ketones, cracked gasoline, toluol, etc. For this purpose, my product is preferably distilled to fractionate it; and a fraction may then be used having the boiling range desired for motor fuel, and such fraction blended or mixed with other motor spirit.

The raw material used may be widely varied; hydrocarbon, air and oxides or any or all of them may be supplied as desired; withdrawal of the products may be continuous or intermittent. In the series form, the product may be condensed or partially condensed between chambers or at the end of the system before the atmosphere is drawn into the acid recovery system; the recovery system may or may not be used; bleed-off to the air may be employed in any of the closed systems to provide constant conditions, in connection with feeding in more material or materials; the withdrawal of liquids may be continuous or intermittent, and many other changes may be made without departing from my invention.

By "finely divided" in my claims, I intend to include hydrocarbon in vapor or gas phase as well as in fine spray, drops or mist. The oxides used are over 3% by volume of the hydrocarbon treated and the results are in fluid state and are better when over 15%, over 25%, over 50% or even more oxides than the hydrocarbon volume are used. By the words "in fluid state" or similar words herein I mean to include oxides in liquid form or in vapor or gaseous phase.

I claim:

1. In the partial oxidation of hydrocarbons, the steps consisting of mixing hydrocarbon heavier than methane in finely divided condition with finely divided oxides in fluid state and in a proportion greater than 7% by liquid volume of oxides to hydrocarbons, and with a gas containing free oxygen, and passing the mixture into a reaction chamber at a temperature below 250° C.

2. In the partial oxidation of hydrocarbons, the steps consisting of mixing hydrocarbon heavier than methane in finely divided condition with a relatively large proportion of finely divided oxides in fluid state and in a proportion greater than 7% by liquid volume of oxides to hydrocarbons, and with a gas containing free oxygen, and passing the mixture into a reaction chamber at a temperature below 425° C.

3. In the partial oxidation of hydrocarbons, the steps consisting of mixing hydrocarbon heavier than methane in finely divided condition with materially more than 7% by volume of finely divided oxides when in the same fluid state as the hydrocarbon and with a gas containing free oxygen, and passing the mixture into a reaction chamber at a temperature below 450° C.

4. In the partial oxidation of hydrocarbons, the steps consisting of mixing normally liquid hydrocarbon in finely divided condition with more than 7% by volume of finely divided oxides when in the same fluid state and with a gas containing free oxygen, and passing the mixture into a reaction chamber at a temperature below 200° C.

5. In the partial oxidation of hydrocarbons, the steps consisting of mixing hydrocarbon in finely divided condition with materially more than 7% by volume of finely divided oxides when both are in the same fluid state and with a gas containing free oxygen, and passing the mixture into a reaction chamber at a temperature below 150° C.

6. In the partial oxidation of hydrocarbons, the steps consisting of mixing hydrocarbon in finely divided condition with more than 7% by liquid volume of finely divided oxides when both are in the same fluid state and with a gas containing free oxygen, and passing the mixture into a reaction chamber at a temperature below 100° C.

7. In the partial oxidation of hydrocarbons, the steps consisting of mixing hydrocarbon heavier than methane in finely divided condition with finely divided oxides in fluid form to a percentage of over 7% by volume when both are in the same fluid state and with a gas containing free oxygen, and passing the mixture into a reaction chamber at a temperature below red heat.

8. In the partial oxidation of hydrocarbons, the steps consisting of mixing liquid hydrocarbon in finely divided condition with finely divided oxides in fluid form and a gas containing free oxygen, passing the mixture into a reaction chamber at a temperature materially below 250° C., and maintaining the reaction chamber at approximately even temperature during the operation.

9. In the partial oxidation of hydrocarbons, the steps consisting of mixing normally-liquid hydrocarbon in finely divided condition with finely divided oxides of nitrogen to over 7% by volume of the hydrocarbon when both are in the same fluid phase, and passing the mixture into a reaction chamber at a temperature below 450° C.

10. In the partial oxidation of hydrocarbons, the steps consisting of feeding a mixture of normally-liquid hydrocarbon in finely divided form, finely divided oxides to materially over 7% by volume thereof when both are in the same fluid phase, and a gas containing free oxygen into a reaction zone, and cycling the same therein.

11. In the partial oxidation of hydrocarbons, the steps consisting of feeding a mixture of normally-liquid hydrocarbon in finely divided form, finely divided oxides to materially over 7% by volume thereof when both are in the same fluid phase, and a gas containing free oxygen into a reaction zone, and repeating the operation in at least two successive reaction chambers.

12. In the partial oxidation of hydrocarbons, the steps consisting of feeding a mixture of normally-liquid hydrocarbon in finely divided form, finely divided oxides to materially over 7% by volume thereof when both are in the same fluid phase, and a gas containing free oxygen into a reaction zone, cycling the same therein, and repeating the operation in at least two successive reaction chambers.

13. In the partial oxidation of hydrocarbons, the steps consisting of mixing hydrocarbon heavier than methane in finely divided condition with finely divided oxides in fluid form and a gas containing free oxygen, passing the mixture into a reaction chamber at a temperature materially below 250° C., and revivifying the oxides passing out of the system.

14. In the partial oxidation of hydrocarbons, the steps consisting of mixing hydrocarbon heavier than methane in finely divided condition with more than 10% by volume of finely divided oxides when both are in the same fluid form and with a gas containing free oxygen, and passing the mixture into a reaction chamber at a temperature below 450° C.

15. In the partial oxidation of hydrocarbons, the steps consisting of mixing hydrocarbon heavier than methane in finely divided condition with more than 20% by volume of finely divided oxides when both are in the same fluid form and with a gas containing free oxygen, and passing the mixture into a reaction chamber at a temperature below 450° C.

16. In the partial oxidation of hydrocarbons, the steps consisting of mixing hydrocarbon heavier than methane in finely divided condition with more than 50% by volume of finely divided oxides when both are in the same fluid form and with a gas containing free oxygen, and passing the mixture into a reaction chamber at a temperature below 450° C.

17. In the partial oxidation of hydrocarbons, the steps consisting of mixing normally liquid hydrocarbon in finely divided condition with finely divided oxides of nitrogen to over 7% by volume of the hydrocarbon when both are in the same fluid phase, passing the mixture into a reaction chamber at a temperature below 450° C., and adding fresh reacting material and repeating the reaction step.

18. In the partial oxidation of hydrocarbons, the steps consisting of feeding a mixture of normally-liquid hydrocarbon in finely divided form, finely divided oxides in fluid form to materially over 7% by volume of the hydrocarbon when both are in the same fluid state, and a gas containing free oxygen into a reaction zone, collecting the liquid product, again finely dividing it, and adding a reacting material.

19. In the partial oxidation of hydrocarbons, the steps consisting of feeding a mixture of normally-liquid hydrocarbon in finely divided form, finely divided oxides in fluid form to materially over 7% by volume of the hydrocarbon when both are in the same fluid state, and a gas containing free oxygen into a reaction zone, collecting the liquid product, again finely dividing it, and adding oxygen-containing gas.

20. In the partial oxidation of hydrocarbons, the steps consisting of feeding a mixture of normally-liquid hydrocarbon in finely divided form, finely divided oxides in fluid form to materially over 7% by volume of the hydrocarbon when both are in the same fluid state, and a gas containing free oxygen into a reaction zone, adding an oxygen-containing gas, and repeating the reaction step.

21. In the partial oxidation of hydrocarbons, the steps consisting of mixing liquid hydrocarbon in finely divided condition with finely divided oxides in fluid form and with a gas containing free oxygen, passing the mixture into a reaction chamber at a temperature materially below 450° C. and revivifying the oxides passing out of the system.

22. In the partial oxidation of hydrocarbons, the steps consisting of mixing liquid hydrocarbon in finely divided condition with more than 7% by liquid volume of oxygen-transferring oxides in fluid state and with a gas containing free oxygen, and passing the mixture into a reaction chamber.

23. In the partial oxidation of hydrocarbons, the steps consisting of mixing liquid hydrocarbon in finely divided condition with more than 7% by liquid volume of oxygen-transferring oxides in fluid state and with a gas containing free oxygen, passing the mixture into a reaction chamber, and recovering oxides.

24. In the partial oxidation of hydrocarbons, the steps consisting of mixing finely divided liquid hydrocarbon with a gas containing free oxygen and with finely divided oxides of nitrogen, and passing the mixture into a reaction zone at a temperature materially below 250° C.

25. In the partial oxidation of hydrocarbons, the steps consisting of mixing finely divided liquid hydrocarbon with a gas containing free oxygen and with finely divided oxides of nitrogen, and passing the mixture through a reaction zone at a temperature below 160° C.

26. In the partial oxidation of hydrocarbons, the steps consisting of mixing finely divided liquid hydrocarbon with oxides of nitrogen and passing the mixture into a reaction zone at a temperature materially below 250° C.

27. In the partial oxidation of hydrocarbons, the steps consisting of mixing finely divided liquid hydrocarbon with oxides of nitrogen and air and passing the mixture through a reaction zone at a temperature materially below 250° C.

JOSEPH HIDY JAMES.